Aug. 23, 1966  G. STADE ET AL  3,267,616
GRINDING MACHINE

Filed Feb. 12, 1964  3 Sheets-Sheet 1

Inventors
GERHARD STADE
GEORG STAHN
By McGlew and Toren,
Attorneys

Inventors
GERHARD STADE
GEORG STAHN
By: McGlew and Toren,
Attorneys

3,267,616
GRINDING MACHINE
Gerhard Stade, Berlin, and Georg Stahn, Berlin-Tegel, Germany, assignors to Firma Herbert Lindner G.m.b.H. & Co., Berlin-Wittenau, Germany
Filed Feb. 12, 1964, Ser. No. 344,266
Claims priority, application Germany, May 14, 1963, L 44,878
8 Claims. (Cl. 51—95)

This invention relates in general to grinding machines, and in particular to a new and useful apparatus and method for relieving, particularly relief-grinding of grooved workpieces, using cam control means for carrying out the relieving movement of the grinding wheel during its ordinary stroke movement and means for advancing the cutting tool by a fixed increment when the tool is aligned with the groove, and to a method for grinding such workpieces.

In grinding cylindrical treads, the relative movement between the workpiece and the tool is composed of two components, a rotary movement (mostly rotation of the workpiece), and a translatory movement in relation thereto by the tool in the direction of the workpiece axis. The ratio of translation to rotation indicates the thread pitch. In grinding conical threads, a third component is added to the above two movements, namely a movement of the grinding tool in relation to the workpiece in a radial direction. The ratio of this radial feed to the translatory movement produces the slope of a conical thread. The radial feed movement for conical threads is usually controlled by a straight edge which tips, for guiding a table with the clamped workpiece against a grinding wheel, or for shifting a grinding wheel stand with respect to the workpiece in the known prior art machines. In these cases the straight edge is connected with the grinding table and with the sliding carriage, respectively. In practice, the possible slope of a straight edge is limited. The relieving which is necessary and which is usually derived from a control cam, will not be completed and will require additional work due to the radial increase of the tooth flanks in the conical part. This additional work has been done up to now by giving the relief cam a corresponding larger stroke. In such cases, there is a great dependency on the accuracy of the relief cam. If the slope is too small, it does not remove a sufficient conical excess in the relief of the tooth so that a relieved workpiece, for example a tap drill, squeezes. Thus, it is desirable to avoid the above possibilities and to insure in any case a sufficient minimum relief, even when the relief cam should be inaccurate.

In accordance with the present invention, a machine is provided having a cam control which effects a feed jump to the next larger radius dimensioned according to the conical course. The jump is effected within the grooves of the workpiece and the cylindrical flanks produced with this radius are relieved at the same time. This has the advantage that the relief cam which has a smaller pitch and which otherwise could only be used for cylindrical workpieces, may now also be used for relieving conical workpieces, thus insuring that the relief work done, even though the cam may be inaccurate, is still sufficient to avoid squeezing of the teeth.

A further advantage is that the teeth can be relieved with one and the same relief cam on one and the same workpiece simultaneously in the conical and in the cylindrical part. This was not possible up to now and two separate relief cams has to be used. In addition, the present construction has the advantage that a straight edge can be eliminated and that even conical parts or grooved workpieces, for example blind hole tap drills, which have in the cutting part slopes of around 1:2.5, can be relieved with machines.

In accordance with the invention, there is provided a device which includes a step-switch mechanism for the stepwise feed of the workpiece, such as a grinding wheel, by equal amounts which is actuated in dependence on the rotary movement of a relief cam. The relief cam actuates a switch element and a stepwise feed is followed by relief-grinding from tooth to tooth under the control of the relief cam.

An advantage of the embodiment of the invention consists in that the relief cam, which is known is driven in dependence on the rotary movement of the work spindle over change gears (or in the case of helically grooved tools over a differential), is also associated with a trip cam for actuating some transmission means. The transmission means may comprise a transmitter such as a contact arranged in the path of the trip cam which is actuated at each revolution of the cam during the passage of each groove of the workpiece being produced. A receiving switch mechanism is located to receive the actuating impulse and to operate the feed gear of the tool in respect to the workpiece. The feed gear preferably contains a ratchet mechanism whose ratchet wheel is arranged on a feed shaft and whose pawl is actuated by a cylinder piston drive with a magnetic control valve or by a magnet.

In another embodiment of the invention, the feed gear of the tool for the workpiece contains a gear wheel drive, for example, a Maltese cross transmission, whose driver revolves in phase with the relief cam and whose star wheel effects the feed jump from tooth to tooth to the next larger radius, for example over change gears and the feed spindle. The change gears preferably act on a second feed spindle which screws in a fixed nut and which bears with a stop positively connected on the displaceable cylinder of the quick action feed gear which is under the action of a compression spring. In this manner the free mobility of a hand control wheel is insured at any time it is desirable to feed the grinding wheel or tool by hand.

Accordingly, it is an object of this invention to provide an improved method of grinding conically grooved workpieces.

A further object of the invention is to provide a grinding device which includes a drive for shifting the tool or grinding wheel in respect to the workpieces, which drive includes means for moving the grinding wheel to carry out a relief grinding during the movement thereof and also to shift the grinding wheel when it is aligned with a groove of the workpiece.

A further object of the invention is to provide a grinding device, particularly for relief grinding of cutting teeth in the conical part of grooved workpieces, wherein the feed mechanism provides a feed jump to the next larger radius at a time when the tool is within the groove of the workpiece.

A further object of the invention is to provide a grinding device including driving means for rotating a workpiece and for moving a grinding wheel toward and away from the workpiece at a controlled rate, a profile cam for controlling the movement of the grinding wheel to the workpiece during the profile operation, and a timing cam or switch mechanism for effecting the stepwise shifting of the grinding wheel to a larger radius, when the wheel is located on the recessed portion of the workpiece.

A further object of the invention is to provide a grinding device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 3:
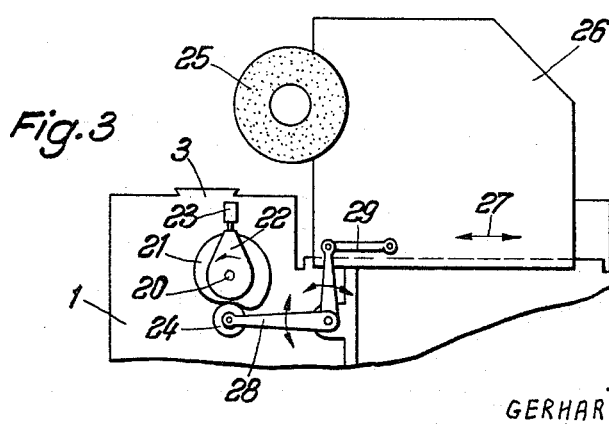
FIG. 3 is a partial enlarged elevational view of the relief movement mechanism.

Referring to the drawings in particular, the invention embodied therein comprises a machine frame 1 of a thread grinding machine having a grinding table or sliding carriage 2 which moves backwardly and forwardly in longitudinal guides 3 in the directions of the double arrow indicated at 4. A workpiece 5 is clamped between clamping points 6, 6 of a spindle sleeve 7 and a work spindle 8, respectively. The work spindle 8 is rotated by gearing schematically indicated 11 by a motor 10 arranged on top of a gear housing 9. Shafts 12 and 15 are also rotated by the gear mechanism 11. The shafts 12 and 15 are connected with differential change gears 13 and differential gears 14, respectively, the latter effecting rotation of shaft 16. Bevel gear groups 17 and 19 are provided to effect driving rotation of shaft 20 over a set of change gears 18 (called slot number change gears). The pairs of bevel gears 17 and 19 have a reduction ratio of 1:1. The shaft 20 carries a relief cam 21 and a switch element 22 which is a trip cam in the embodiment illustrated. The trip cam 22 actuates a contact 23 during each single revolution. The contact 23 is designed as a transmitter, and the gearing and the trip cam 22 are arranged such that the transmitter or switch 23 will be actuated each time a groove 5a in the workpiece 5 is approached by the grinding wheel 25 which is carried on a movable carriage or wheel stand 26. This actuation takes place just as the relief cam 21 is about to start a new slope opposite the roller follower 24 which is biased into contact therewith (see FIG. 3).

Figure 6:
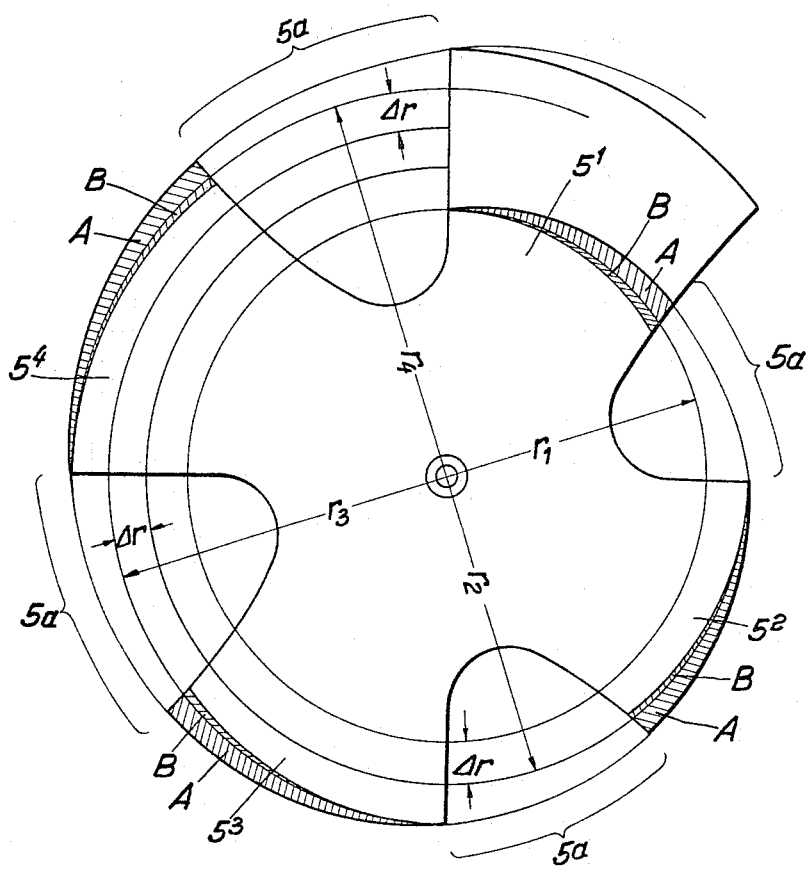
FIG. 6 is a somewhat schematic enlarged sectional indication of a relieved conical workpiece made in accordance with the invention.

The grinding wheel 25, which is supported in the wheel stand 26, performs a reciprocal movement in the direction of the arrows 27 during one revolution of the cam 21 to effect the relieving movement for each tooth necessary for the relief thereof. This movement is transmitted by an angle lever 28 having the roller follower 24 through an intermediate or connecting lever 29 to the wheel stand 26. In the represented embodiment of the tap drill workpiece 5 indicated in FIG. 6, the teeth of a thread course are designated as $5^1$, $5^2$, $5^3$, and $5^4$.

Figure 1:
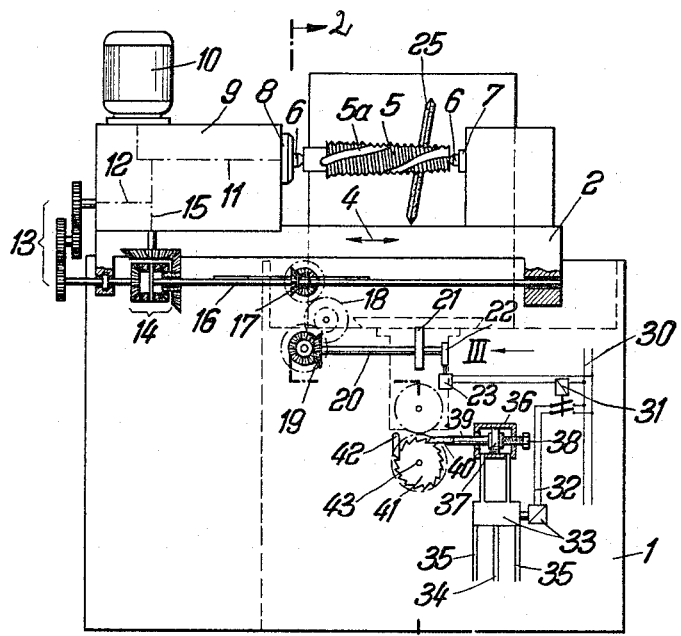
FIG. 1 is a somewhat schematic partial side elevational and partial sectional view of a grinding machine constructed in accordance with the invention.

The switch or transmitter 23, as indicated in FIG. 1, is connected to an electrical circuit line 30 in series with a relay 31 which is arranged to open and close a circuit line 32 leading to a magnetic control valve 33. The magnetic control valve 33 is arranged to supply a pressure actuating fluid from a pressure line 34 to selective sides of a piston 37 which reciprocates in a control cylinder 36. The stroke of the piston may be limited by a stop nut 38. The piston 37 carries a rod 39 with a pawl 40 which engages a ratchet wheel 41 which is affixed to a shaft 43. The ratchet is provided with a detent 42 for holding the ratchet in an indexed position. The driving mechanism indicated, of course, can be replaced in a simple manner by electromagnetic or magnetic means for directly actuating a plunger (not shown) which instead of rod 39 contains the pawl 40.

The ratchet wheel 41 causes rotation of the shaft 43 (FIG. 2) and a gear 45 affixed thereto to rotate a gear wheel 46 and a shaft 48 on which it is mounted to effect rotation of a feeding spindle or screw 47 which is held in a nut 51 on the wheel stand 26. Rotation of the feed screw 47, of course, causes movement of the wheel stand in the direction of the arrows 27, as indicated in FIG. 2.

Figure 2:
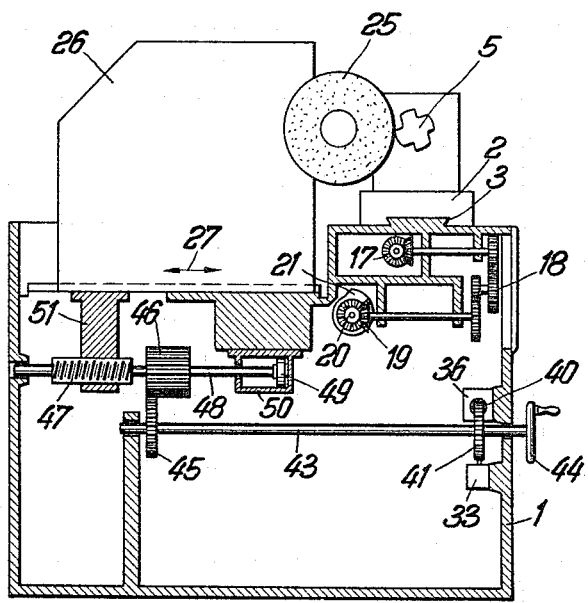
FIG. 2 is a section taken on the line 2—2 of FIG. 1.

A hand wheel 44 is also secured to shaft 43, as indicated to the right of FIG. 2, for effecting a hand feed of the roll stand 26, when desired. At each step of the ratchet wheel 41, which takes place when the grinding wheel 26 just passes the groove 5a of the workpiece 5, a feed jump $\Delta_r$ equal to the next larger radius takes place. This feed jump is dimensioned according to the conical course, for example from $r_1$ to $r_2$ or from $r_2$ to $r_3$, or from $r_3$ to $r_4$ (see FIG. 6). The increase in radius is always the same, so that a stepwise feed of the grinding wheel, when it is located within the groove 5a, takes place. Since the grinding feed of the wheel 25 is stopped during the grinding of each tooth flank apart from the relieving movement, the latter is machined cylindrically from tooth to tooth with a radius $r_1$ to $r_4$, corresponding to the conical course and the amount A is thus removed from the cone. In addition, however, the relieving amount B is removed by the relief cam 21 which is of a design for making cylindrical grindings. Both the amounts A and B yield the effective relief amount on the conical workpiece for each tooth. Naturally, it is also possible to work in opposite directions, that is from larger to smaller diameters, if desired.

Figure 4:
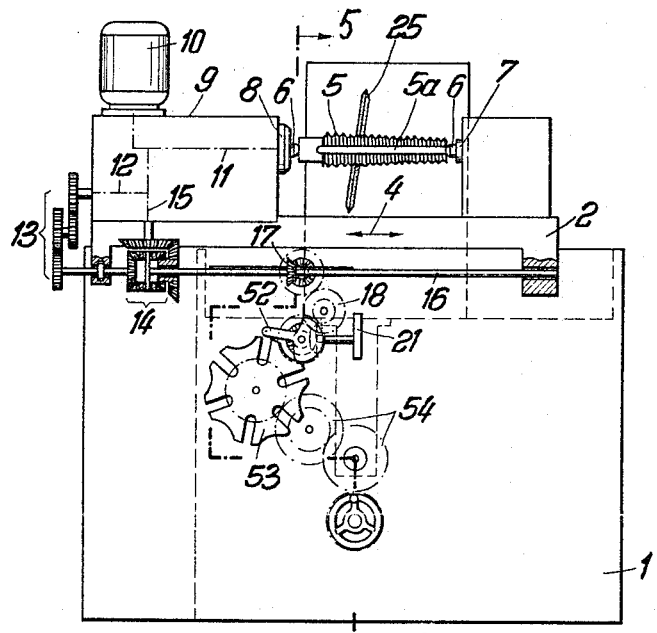
FIG. 4 is a section similar to FIG. 1 of another embodiment of the invention.
Figure 5:
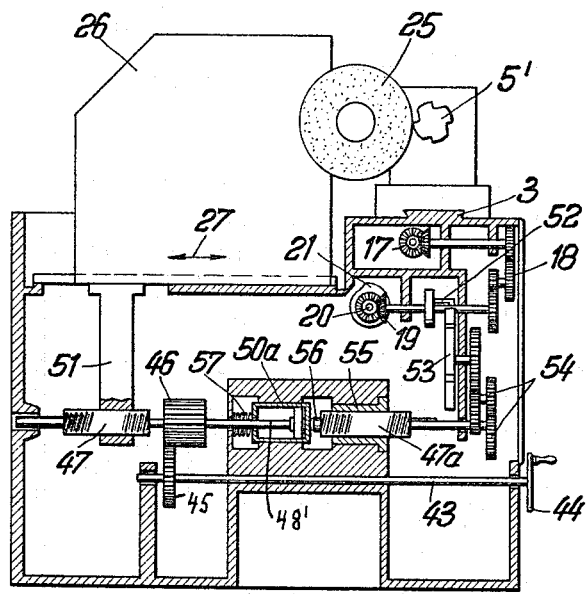
FIG. 5 is a section taken on the line 5—5 of FIG. 4.

In the embodiment indicated in FIGS. 4 and 5, the parts which are identical to the first embodiment are similarly designated. In this embodiment, however, the feed gear of the tool to the workpiece 5 includes a gear wheel drive with a Maltese cross transmission. A driver 52 for the transmission rotates in phase with the relief cam 21. In this embodiment, a feed jump is effected by purely mechanical means, that is, the star wheel or Maltese cross 53. The driver 52 corresponds to the trip cam 22 of the other embodiment, but the electrical and hydraulic switching means are not required. The star wheel 53 is moved directly by the driver and controls the feed jump from tooth to tooth. Since the switching angle of the gear wheel drive is constant, the stepwise feed is adapted over additional change gears indicated 54 to the requirements for the workpiece 5'.

In order to make sure that the hand wheel 44 can be operated at any time and is not locked by the gear wheel drive, a second feed spindle 47a is employed for automatically effecting the step-wise feed which is driven by the gear wheel drive 54 and which bears, by a projection or stop 56, against a displaceable cylinder 50a. The feed spindle 47a is rotatable in a stationary threaded member 55. The cylinder 50a is biased against the stop 56 by a compression spring 57. A piston rod member 48' formed as a continuation of the shaft 48 of the other embodiment moves the screw 47 axially along with the nut 47 to shift the wheel stand 26 backwardly and forwardly. The manual drive is by hand wheel 44 to rotate shaft 43, gear 45 and gear 46 along with screw 47 to cause a shifting of nut 51 and wheel stand 26.

While specific embodiments of the invention have been shown and described in detail to illustrate the application of the inventive principles, it will be understood that the invention may be embodied otherwise without departing from such principles.

What is claimed is:

1. A method for relieving, particularly relief grinding, cutting teeth in the conical part of grooved workpieces, where corresponding points of the cutting edges lie on a conical thread line and where the relieving movement is derived from a cam, comprising making a feed jump by moving the cutting tool to the next larger radius when the tool is located in alignment with the groove of the workpiece corresponding to the conical course, and making a cylindrical flank on the workpiece with the tool seat at this radius while relieving the flanks at the same time.

2. A device for relieving, and particularly relief grinding, the cutting teeth of grooved workpieces such as a tap drill, comprising means for rotatably supporting a workpiece, grinding wheel means, feed gear means for moving said grinding wheel means backwardly and forwardly toward and away from said workpiece and for rotating said workpiece supporting means, said feed gear means including a rotatable relief control cam, relief grinding control means operatively associated with said relief control cam and movable thereby effective to shift said grinding wheel means for relieving the workpiece, such feed gear means further including means rotatable in timed relationship with said relief control cam effective to shift said grinding wheel means by a predetermined fixed increment when said gear wheel means is aligned with the groove of the workpiece whereby cutting of the next tooth will be at a changed radius.

3. A device for relieving, and particularly relief grinding, the cutting teeth of grooved workpieces such as a tap drill, comprising means for rotatably supporting a workpiece, grinding wheel means, feed gear means for moving said grinding wheel means backwardly and forwardly toward and away from said workpiece and for rotating said workpiece supporting means, said feed gear means including a rotatable relief control cam, and relief grinding control means operatively associated with said relief control cam and movable thereby effective to shift said grinding wheel means for relieving the workpiece, including: a trip cam rotatable with said relief control cam, switch means in alignment with said trip cam for actuation thereby when said grinding wheel means is aligned with the groove of the workpiece, and means connected to said switch means to shift said grinding wheel means by a predetermined fixed increment when said switch means is actuated by said trip cam whereby cutting of the next tooth will be at a changed radius.

4. A device for relieving, ond particularly relief grinding, the cutting teeth of grooved workpieces such as a tap drill, comprising means for rotatably supporting a workpiece, grinding wheel means, feed gear means for moving said grinding wheel means backwardly and forwardly toward and away from said workpiece and for rotating said workpiece supporting means, said feed gear means including a rotatable relief control cam, a trip cam rotatable with said relief control cam, a switch arranged adjacent said trip cam for actuation thereby only when said grinding wheel is aligned with a groove of the workpiece, a ratchet wheel connected to said grinding wheel means for shifting said grinding wheel means a predetermined fixed increment upon movement of said ratchet wheel, a fluid cylinder, a piston slidable in said cylinder and having a rod portion with a pawl engageable with said ratchet for shifting said ratchet, and means connected between said switch means and said fluid cylinder for directing a fluid under pressure to a selected side of said piston for shifting said piston upon actuation of said switch means.

5. A device for relieving, and particularly relief grinding, the cutting teeth of grooved workpieces such as a tap drill, comprising means for rotatably supporting a workpiece, grinding wheel means, feed gear means for moving said grinding wheel means backwardly and forwardly toward and away from said workpiece and for rotating said workpiece supporting means, said feed gear means including a rotatable relief control cam, means operatively associated with said relief control cam and movable thereby effective to shift said grinding wheel means for relieving the workpiece, a driver rotatable with said relief control cam, a Maltese cross operatively associated with said driver and being indexed upon each rotation of said driver, said driver being set to index said cross when the grinding wheel is located over the groove of the workpiece, and means connected to said cross and movable upon movement of said cross to shift said grinding wheel means a predetermined increment whereby cutting of the next tooth will be at a changed radius.

6. A device for relieving, and particularly relief grinding, the cutting teeth of grooved workpieces such as a tap drill, comprising means for rotatably supporting a workpiece, grinding wheel means, feed gear means for moving said grinding wheel means backwardly and forwardly toward and away from said workpiece and for rotating said workpiece supporting means, said feed gear means including: a rotatable relief control cam, means operatively associated with said relief control cam and movable thereby effective to shift said grinding wheel means for relieving the workpiece, means rotatable in timed relationship with said relief control cam effective to shift said grinding wheel means by a predetermined fixed increment when said grinding wheel means is aligned with the groove of the workpiece whereby cutting of the next tooth will be at a changed radius, said last named means including a wheel stand, a grinding wheel rotatable on said wheel stand, said wheel stand being shiftable backwardly and forwardly and having a nut thereon, a screw threadably engaged with said nut and being rotatable for shifting said nut and said wheel stand, and hand wheel means rotatable to rotate and shift said screw for shifting said wheel stand with said grinding wheel manually.

7. A device for relieving, and particularly relief grinding, the cutting teeth of grooved workpieces such as a tap drill, comprising means for rotatably supporting a workpiece, grinding wheel means, feed gear means for moving said grinding wheel means backwardly and forwardly toward and away from said workpiece and for rotating said workpiece supporting means, said feed gear means including a rotatable relief control cam, means operatively associated with said relief control cam and movable thereby effective to shift said grinding wheel means for relieving the workpiece, said feed gear means further including means rotatable in timed relationship with said relief control cam effective to shift said gear wheel means by a predetermined fixed increment when said gear wheel means is aligned with the groove of the workpiece whereby cutting of the next tooth will be at a changed radius, said means rotatable in timed relationship with said relief cam and effective to shift said gear wheel means including a first threaded screw, a grinding wheel, said grinding wheel means including a grinding wheel stand having a nut thereon engageable with said first threaded screw, said threaded screw being rotatable to shift said nut therealong with said grinding wheel stand, a second threaded screw rotatable when said gear wheel means is aligned with the groove of said workpiece and being axially displaceable by such rotation, and means connected to said second screw for displacing said grinding wheel means upon rotation of said second screw and independently of said first screw.

8. A device according to claim 7, including a hand wheel connected to said first screw for rotating said first screw independently of said second screw.

References Cited by the Examiner

UNITED STATES PATENTS

| 1,624,868 | 4/1927 | Hanson | 51—101 |
| 2,060,044 | 11/1936 | Crowey | 51—95.2 |

LESTER M. SWINGLE, *Primary Examiner.*